Sept. 6, 1932.  J. S. JOHNSON  1,876,422
HAYFORK
Filed July 22, 1931   2 Sheets-Sheet 1
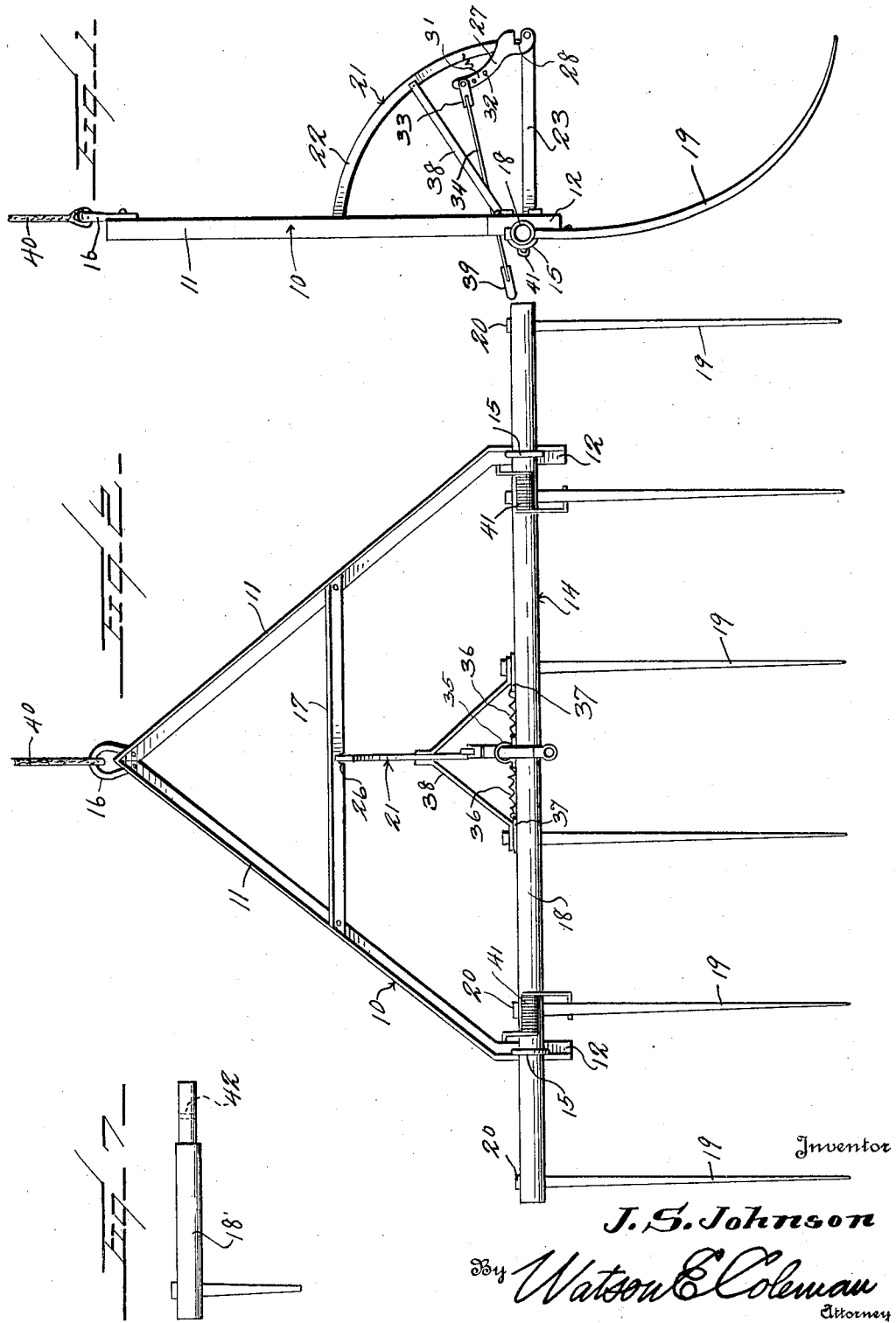
Inventor
J. S. Johnson
By Watson E. Coleman
Attorney Sept. 6, 1932.  J. S. JOHNSON  1,876,422
HAYFORK
Filed July 22, 1931   2 Sheets-Sheet 2
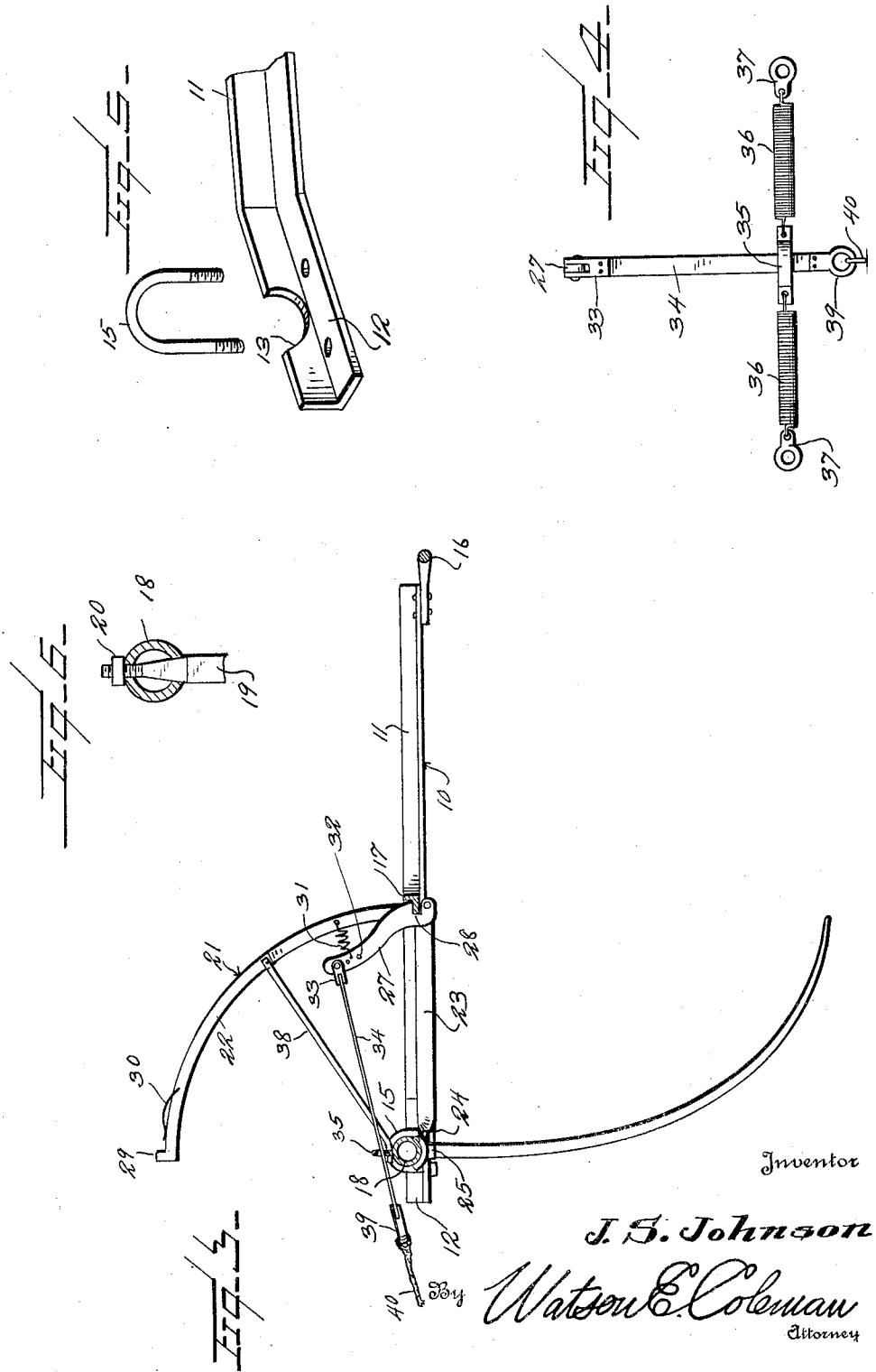
Inventor
J. S. Johnson
By Watson E. Coleman
Attorney Patented Sept. 6, 1932

1,876,422

UNITED STATES PATENT OFFICE

JOSEPH S. JOHNSON, OF COLLINSTON, UTAH

HAYFORK

Application filed July 22, 1931. Serial No. 552,519.

This invention relates to hay forks, and more particularly to a loading or stacking fork.

An object of this invention is to provide a novel fork which is so constructed that it will be able to handle an exceedingly large quantity of hay at one time, so as to permit the hay to be moved from one point to another, and dropped when it has been moved to the desired point.

Another object of this invention is to provide a relatively simple fork structure including means whereby the structure may be enlarged so as to increase the carrying capacity of the device.

A further object of this invention is to provide novel tripping means for tripping the fork, the tripping means being so constructed as to not swing or rotate the loaded fork while the tripping rope is being pulled.

The above and various other objects and advantages of this invention will in part be described in and in part be understood from the following detailed description of the present preferred embodiment, the same being illustrated in the accompanying drawings, wherein:—

Figure 1 is a detail end elevation of a device constructed according to the preferred embodiment of this invention, showing the device in open position;

Figure 2 is a detail side elevation of the device in open position;

Figure 3 is a longitudinal sectional view taken substantially through the center of the device in closed or operative position;

Figure 4 is an enlarged plan view showing the manner of mounting the tripping mechanism on the device;

Figure 5 is a fragmentary enlarged perspective view showing the manner of mounting the rake structure on the frame;

Figure 6 is a sectional view taken through the rake structure showing the manner of securing the tines to the connecting bar, and Figure 7 is a side elevation of an extensible member used in combination with this structure.

Referring to the drawings, wherein like numerals of reference designate corresponding parts throughout the several views, the numeral 10 designates generally a frame structure comprising a pair of forwardly converging L-shaped members 11 which are secured together at the forward end thereof, and the divergent ends of these frame members 11 are provided with parallel extensions 12 which are cut out, as at 13, so as to rotatably receive an elongated fork structure, generally designated as 14. This fork structure 14 is rotatably carried by the parallel extensions 12 by means of a U-shaped bolt 15, or the like. The converging ends of the frame sections 11 are provided with a loop 16 which is adapted to receive a draw cable or the like. A transverse brace 17 connects the frame sections 11 together intermediate the forward and rear ends thereof. The fork structure 14 comprises an elongated round bar 18, which is rotatably mounted in the rear ends of the frame sections 11, and a plurality of arcuate tines 19 are secured to the upper ends of the tines 19 extending through the bar 18 and having a nut 20 threadably mounted on the upper end thereof, so as to removably secure these tines in spaced position along the bar 18.

In actual practice, the bar 18 comprises an elongated tubular member and the upper end portions of the tines 19 are preferably square in cross section, and the lower apertures in the bar 18 are of a like configuration, the threaded extensions of the tines 19 being round in cross section and extending through similar openings in the upper edge portion of the bar 18.

In order to secure the fork structure 14 in desired position, I have provided a releasable locking mechanism, generally designated as 21. This locking mechanism 21 is carried by the fork structure 14 and comprises a segmental member 22, which is secured to the bar 18 by means of a brace 23, one end of the segmental member 22 being secured to the brace 23 rearwardly of the forward end thereof. The rear end of the brace 23 is preferably bent, as at 24, so as to engage about the periphery of the bar 18 and is secured to the bar by means of a bolt 25, or the like. The peripheral portion of the segmental member 22 is adapted to engage in a slot 26 in the cross bar 17, this slot or notch being adapted to prevent sidewise movement of the segmental member 22.

A tripping lever 27, which is provided with a notch 28, is pivotally mounted on the forward end of the brace 23 and is adapted to engage the cross bar 17, so as to hold the fork structure 14 against swinging movement with respect to the frame 10. The opposite end of the segmental member 22 is provided with an outstanding lug 29 and a spring 30 is mounted on the peripheral portion of the segmental bar 22 and disposed inwardly of the free end of the bar, this spring 30 being of arched construction and adapted to hold the angle bar 17 into engagement with the stop lug 29.

The tripping lever 27 is held into locking position by means of a contractile spring 31, which engages the segmental bar 22 at one end thereof, and the opposite end of the spring 31 is mounted in the lever 27. This lever 27 is also provided with a plurality of spaced apertures 32 for adjustably receiving a clevis 33, this clevis 33 having a strap 34 secured thereto and extending rearwardly toward the fork structure 14.

A guide loop 35 is resiliently disposed in substantially the center of the bar 18, this loop 35 having springs 36 extending outwardly from each side thereof, the opposite ends of the springs 36 engaging washers 37 which are carried by the bar 18. The segmental member 22 is held against sidewise movement with respect to the fork structure 18 by means of a pair of braces 38 which are secured at one end to the bar 18 and these braces 38 are disposed in forwardly converging relation and engage the opposite sides of the segmental bar 22. The rear end of the strap 34 is provided with a ring or eye 39 to which may be attached a tripping rope for operation at a point remote from the rack structure. Through the use of the resiliently mounted guide loop 35, when the trip rope 40 is pulled from a point angularly disposed with respect to the fork, the guide loop 35 will be pulled to one side without swinging the entire fork structure.

A pair of springs 41 are mounted one at each side of the rear ends of the frame members 11, one end of the springs 41 engaging the frame member 11 and the opposite end of each spring engages adjacent tines 19, these springs 41 being adapted to normally swing the fork structure 14, so that the tines 19 will be in substantial alinement with the frame structure 10. In this position, the fork structure 14 is in released position so as to release a load of hay which is carried by the tines 19.

In the operation of this device, the tines 19 may be disposed in a position substantially in alinement with the frame structure 10, in which position the tines may be projected into a quantity of hay. The frame structure 10 may then be swung on the bar 18, so that the releasable locking member 27 will engage the cross bar 17 and hold the frame structure 10 at substantially right angles to the fork structure 14. In this position, the device will pull or carry a quantity of hay which is engaged by the tines, and when the hay has been moved or lifted to the desired position, the tripping rope 40 may be pulled, so as to move the locking member 27 into released position and permit the fork structure 14 to rotate into released position. In order to provide means by which an increased quantity of hay or the like may be carried by the fork structure herein disclosed, I have provided tubular extensions 18' which are adapted to telescope the outer ends of the tubular member 18, and provided with registering openings 42 for receiving the tines 19, so that the tines 19 and the securing elements therefor will hold the extensions 18' in secured position on the outer ends of the bar 18.

It is, of course, understood that various changes and modifications may be made in the details of construction and design of the above specifically described embodiment of this invention without departing from the spirit thereof, such changes and modifications being restricted only by the scope of the following claims.

I claim:—

1. A loading fork of the character described comprising a frame structure, a fork structure swingably carried by the frame, means for releasably locking the fork structure in adjusted position in the frame, and yieldable means engaging the fork structure and the frame for constantly urging the fork structure in released position.

2. A loading fork of the character described comprising a frame structure, a fork structure swingably carried by the frame and releasable locking means carried by the fork structure and engaging the frame whereby to hold the fork structure in adjusted position with respect to the frame, said locking means comprising a segmental bar, means for holding the segmental bar in adjusted position on the fork structure, and a pivoted locking member carried by the segmental member and engaging the frame structure for holding the fork structure in adjusted position with respect to the frame.

3. A fork of the character described comprising a frame, an elongated bar rockably carried by the frame, tines carried by the bar, means engaging the bar and the frame for constantly urging the tines into a position in substantial alinement with the frame, and releasable locking means carried by the bar and engaging the frame for holding the tines in a position at substantially right angles to the frame.

4. In a fork structure of the character described including a frame and a fork pivotally carried by the frame, releasable locking means carried by the fork and engaging the frame for holding the fork in adjusted position with respect to the frame, said locking means comprising a segmental member, bracing means engaging the fork and the segmental member for holding the segmental member in outstanding relation to the fork, said frame structure having a slot therein whereby to slidably receive the segmental member and hold the segmental member against sidewise movement, and a pivoted lock carried by one of the bracing members and engaging the frame for holding the fork in adjusted position with respect to the frame.

5. A fork of the character described comprising a frame, an elongated bar swingably carried by the frame, tines carried by the bar, a segmental member, bracing means engaging the segmental member and the bar for holding the segmental member in outstanding relation with respect to the bar for swinging movement therewith, a pivoted locking member carried by one of the bracing members and engaging the frame structure for holding the bar in adjusted relation with respect to the frame, a stop member mounted on one end of the segmental member for limiting the swinging movement of the bar with respect to the frame, and yieldable means carried by the segmental member adjacent the stop for yieldably holding the frame into engagement with the stop member.

6. A fork structure of the character described comprising a frame, an elongated bar pivotally carried by the frame, tines mounted in the bar, a segmental member, bracing means engaging the bar and the segmental member for holding the member in outstanding relation to the bar, a pivoted locking member carried by one of the bracing members and disposed at one end of the segmental member and engaging the frame for holding the bar in adjusted position with respect to the frame, and means carried by the opposite end of the segmental member for yieldably holding the frame in adjusted relation to the bar.

7. A fork of the character described comprising a frame, a fork pivotally carried by the frame, releasable locking means carried by the fork and engaging the frame for holding the fork in adjusted position with respect to the frame, a flexible tripping member secured at one end to said releasable locking means, a guide loop loosely engaging the tripping member, and means for yieldably mounting said guide member on the fork for longitudinal movement with respect thereto.

8. A fork of the character described comprising a frame, a fork pivotally carried by the frame, said fork comprising an elongated bar, tines mounted in the bar, releasable locking means carried by the bar and engaging the frame for releasably holding the bar in adjusted position with respect to the frame, and an extension telescoping one end of the bar, and a tine carried by said extension.

In testimony whereof I hereunto affix my signature.

JOSEPH S. JOHNSON.